United States Patent
Kim et al.

(10) Patent No.: US 11,345,643 B2
(45) Date of Patent: May 31, 2022

(54) ADDITIVE COMPOSITION FOR TILE CEMENT MORTAR AND TILE CEMENT MORTAR COMPRISING SAME

(71) Applicant: LOTTE FINE CHEMICAL CO., LTD., Ulsan (KR)

(72) Inventors: Yun Na Kim, Ulsan (KR); Nak Woon Choi, Ulsan (KR); Bong Jin Kwon, Ulsan (KR); Min Seok Kang, Ulsan (KR); Hyun Ji Jeong, Ulsan (KR)

(73) Assignee: LOTTE FINE CHEMICAL CO., LTD., Ulsan (KR)

( * ) Notice: Subject to any disclaimer, the term of this patent is extended or adjusted under 35 U.S.C. 154(b) by 76 days.

(21) Appl. No.: 16/641,316

(22) PCT Filed: Mar. 23, 2018

(86) PCT No.: PCT/KR2018/003411
§ 371 (c)(1),
(2) Date: Feb. 24, 2020

(87) PCT Pub. No.: WO2019/039688
PCT Pub. Date: Feb. 28, 2019

(65) Prior Publication Data
US 2020/0290934 A1    Sep. 17, 2020

(30) Foreign Application Priority Data
Aug. 22, 2017 (KR) .......... 10-2017-0106251

(51) Int. Cl.
| | | |
|---|---|---|
| C04B 40/00 | (2006.01) | |
| C04B 24/12 | (2006.01) | |
| C04B 24/38 | (2006.01) | |
| C04B 28/04 | (2006.01) | |
| E04C 2/26 | (2006.01) | |
| E04F 13/14 | (2006.01) | |
| E04F 15/08 | (2006.01) | |
| C04B 103/00 | (2006.01) | |
| C04B 111/00 | (2006.01) | |

(52) U.S. Cl.
CPC ........ *C04B 40/0039* (2013.01); *C04B 24/126* (2013.01); *C04B 24/383* (2013.01); *C04B 28/04* (2013.01); *E04C 2/26* (2013.01); *E04F 13/14* (2013.01); *E04F 15/08* (2013.01); *C04B 2103/0093* (2013.01); *C04B 2111/00646* (2013.01)

(58) Field of Classification Search
CPC ..... C04B 24/126; C04B 24/383; C04B 28/04; C04B 40/0039; C04B 2103/0093; C04B 2111/00646; E04C 2/26; E04F 13/14; E04F 15/08
See application file for complete search history.

(56) References Cited

U.S. PATENT DOCUMENTS

| | | | |
|---|---|---|---|
| 4,021,257 A | 5/1977 | Bernett | |
| 4,402,752 A | 9/1983 | Chesney, Jr. | |
| 2004/0158058 A1 | 8/2004 | Cash et al. | |

FOREIGN PATENT DOCUMENTS

| | | | |
|---|---|---|---|
| CN | 1457764 A | * | 11/2003 |
| CN | 104231847 A | * | 12/2014 |
| CN | 105330324 A | * | 2/2016 |
| CN | 106337296 A | * | 1/2017 |
| JP | 2006514935 A | | 5/2006 |
| JP | 2010-222207 A | | 10/2010 |
| JP | 2015-117176 A | | 6/2015 |
| KR | 10-2015-0050744 A | | 5/2015 |
| KR | 10-2016-0127585 A | | 11/2016 |
| KR | 10-2017-0076971 A | | 7/2017 |

OTHER PUBLICATIONS

Machine Translation of Japanese Patent Specification No. JP 2015-117176 A. (Year: 2015).*
International Search Report issued in corresponding International Application No. PCT/KR2018/003411 dated Jul. 2, 2018 (2 pages).
Written Opinion issued in corresponding International Application No. PCT/KR2018/003411 dated Jul. 2, 2018 (5 pages).
Extended European Search Report issued in EP Application No. 18848641.9 dated Apr. 20, 2021 (5 pages).
Office Action issued in corresponding KR Application No. 10-2017-0106251with English translation dated Oct. 29, 2021 (13 pages).

* cited by examiner

*Primary Examiner* — Anthony J Green
(74) *Attorney, Agent, or Firm* — Osha Bergman Watanabe & Burton LLP

(57) ABSTRACT

Provided are an additive composition for a tile cement mortar and a tile cement mortar including the additive composition for a tile cement mortar. The provided additive composition for a tile cement mortar includes cellulose ether and urea, wherein the amount of the urea is from 5 parts by weight to 43 parts by weight based on 100 parts by weight of the cellulose ether.

7 Claims, No Drawings

ADDITIVE COMPOSITION FOR TILE CEMENT MORTAR AND TILE CEMENT MORTAR COMPRISING SAME

TECHNICAL FIELD

An additive composition for tile cement mortars and tile cement mortars including the same are disclosed. More specifically, an additive composition for a tile cement mortar including cellulose ether and urea and a tile cement mortar including the same are disclosed.

BACKGROUND ART

Cement mortars are what is obtained by mixing cement and sand with an appropriate amount of water and kneading the mixture. Among these cement mortars, tile cement mortars are used for the final finishing of interior, exterior, ceiling and floor of buildings. Tile cement mortars may additionally include, in addition to main materials, such as cement and sand, an additive composition to enhance properties such as viscosity, adhesion force, and pot life.

Cellulose ether is a representative natural thickener, and may have excellent thickening ability, water retention, adhesiveness, dispersibility and stability due to nonionicity, and thus, may be widely used in various fields such as construction additives, cosmetic stabilizers, thickeners for daily supplies, and organic binders.

In tile cement mortars, thickeners are used to prevent separation of materials, to extend the pot life, and to maintain moisture for the hardening of cement, which is the main material. However, when a sufficient open time is not secured, delamination of the tile or adhesive due to insufficient adhesive strength, and a low work efficiency due to shortening of pot life may occur.

DESCRIPTION OF EMBODIMENTS

Technical Problem

One embodiment of the present disclosure provides an additive composition for a tile cement mortar, the additive composition including cellulose ether and urea.

Another embodiment of the present disclosure provides a tile cement mortar including the additive composition for a tile cement mortar.

Solution to Problem

One aspect of the present disclosure provides an additive composition for a tile cement mortar, the additive composition including
cellulose ether and urea,
wherein the amount of urea may be from 5 parts by weight to 43 parts by weight based on 100 parts by weight of the cellulose ether.

The cellulose ether may include hydroxypropylmethylcellulose, hydroxyethylmethylcellulose, hydroxyethylethylcellulose, or a combination thereof.

The cellulose ether may not include methylcellulose.

The viscosity of an aqueous solution of the cellulose ether having a concentration of 2% by weight may be from 8,000 mPa·s to 100,000 mPa·s at 20° C. and at 20 rpm when measured using a Brookfield viscometer.

The urea may be physically mixed with the cellulose ether.

The amount of urea may be from 5 parts by weight to 43 parts by weight based on 100 parts by weight of the cellulose ether.

The additive composition for a tile cement mortar may further include at least one additive in an amount of 0.01 parts by weight to 200 parts by weight based on 100 parts by weight of the total amount of the cellulose ether and the urea.

Another aspect of the present disclosure provides
a tile cement mortar including cement and the additive composition for a tile cement mortar.

The amount of the additive composition for a tile cement mortar may be from 0.1 parts by weight to 10 parts by weight based on 100 parts by weight of the cement.

Advantageous Effects of Disclosure

An additive composition for a tile cement mortar according to one embodiment of present disclosure may improve the open time, pot life, and adhesive strength of the tile cement mortar.

MODE OF DISCLOSURE

Hereinafter, an additive composition for a tile cement mortar according to one embodiment of present disclosure will be described in detail.

The term "open time" used in the present specification refers to the greatest amount of time during which a tile cement mortar is applied to a target surface and then tiles are able to be attached thereon, and the criterion is whether the tensile adhesion strength of the attached tile cement mortar meets ISO 12004 rules.

In addition, the term "pot life" used in the present specification refers to the amount of time during which the tile cement mortar, which is mixed for the applying the same on a target surface, is maintained in such a state as being able to be used.

In addition, the term "tile cement mortar" used in the present specification refers to two different meanings depending on the situation: one of which means that the additive composition for a tile cement mortar, cement and aggregate are dry-mixed; and the other means that the resultant of the dry-mixing is mixed with water, and then, kneaded.

An additive composition for a tile cement mortar according to an embodiment of the present disclosure may include cellulose ether and urea.

The cellulose ether may include hydroxyalkylalkylcellulose, hydroxyalkylcellulose, or a combination thereof.

In detail, the cellulose ether may include hydroxypropylmethylcellulose, hydroxyethylmethylcellulose, hydroxyethylethylcellulose, or a combination thereof.

In one embodiment, the cellulose ether may not include methylcellulose.

When the cellulose ether contains methylcellulose, at least one physical property of the open time, pot life, and adhesive strength of tile cement mortar may be deteriorated.

The hydroxypropylmethylcellulose may have the degree of substitution (DS) of a methyl group of 0.27 to 2.50 and the molar substitution (MS) of a hydroxypropyl group of 0.02 to 1.1.

The hydroxyethylmethylcellulose may have the DS of a methyl group of 0.27 to 2.40 and the MS of a hydroxyethyl group of 0.03 to 1.3.

The hydroxyethylethylcellulose may have the DS of an ethyl group of 0.7 to 1.5 and the MS of a hydroxyethyl group of 0.5 to 2.5.

The viscosity of the aqueous solution of the cellulose ether having a concentration of 2% by weight (hereinafter referred to simply as "the viscosity of 2 wt % aqueous solution") may be from 8,000 mPa·s to 100,000 mPa·s at 20° C. and at 20 rpm when measured using a Brookfield viscometer. When the viscosity of the aqueous cellulose ether solution is within these ranges, a tile cement mortar with good workability with sufficient thickening effect may be provided.

The urea is a colorless and odorless granular crystal having the formula of $CO(NH_2)_2$. The urea has a high solubility in water and exhibits an endothermic pattern when dissolved in water, which may delay the hydration of cement which is an exothermic reaction. In addition, a urea solution is more difficult to evaporate than pure water, thereby reducing the evaporation of water in the tile cement mortar, leading to an increase in the open time and adhesive strength of the tile cement mortar.

The urea may be present in such a state as being physically mixed with the cellulose ether. Specifically, the urea may be mixed with the cellulose ether by wet or dry-mixing.

The amount of urea may be from 5 parts by weight to 43 parts by weight based on 100 parts by weight of the cellulose ether. When the amount of the urea is within the range, the open time, adhesive strength and/or pot life of the tile cement mortar may be improved.

The additive composition for a tile cement mortar may further include at least one additive in an amount of 0.01 parts by weight to 200 parts by weight based on 100 parts by weight of the total amount of the cellulose ether and the urea. When the amount of the additive is within the range, the addition effect may be sufficient, but may not impair the function of the cellulose ether.

The additive may include organic and inorganic thickeners and/or other dispersants.

The organic and inorganic thickeners may include attapulgite, aluminum silicate, starch, gelatinized starch, modified starch, dextrin, polyvinylalcohol (PVA), polyacrylamide (PAM), gums, or a combination thereof.

The dispersant may include a re-emulsifying powder resin, a surfactant, or a combination thereof.

Another embodiment of the present disclosure provides a tile cement mortar including the additive composition for a tile cement mortar, cement, and aggregate.

The smaller the thickness of the tile cement mortar to be constructed is, the more the additive composition for a tile cement mortar described above is used to obtain water retention.

The amount of the additive composition for a tile cement mortar may be from 0.1 parts by weight to 10 parts by weight based on 100 parts by weight of the cement. When the amount of the additive composition for a tile cement mortar is less than 0.1 parts by weight based on 100 parts by weight of the cement, the addition effect is negligible, and when the amount of the additive composition exceeds 10 parts by weight based on 100 parts by weight of the cement, the workability deteriorates and the excessive water-retention property may rather result in a decrease in the adhesive strength.

The cement may be hydraulic cement, such as Portland cement, fly ash cement, and aluminous cement, or color cement.

Also, when needed, hemihydrate gypsum, slaked lime, calcium carbonate, and/or clay may be used in the tile cement mortar with the cement.

The aggregate may be river sand, mountain sand, silica sand, lightweight aggregates (for example, pearlites), or the like. In addition, emulsions and/or fibrous materials may be mixed with the tile cement mortar.

The amount of the aggregate to be mixed may be from 30 to 300 parts by weight based on 100 parts by weight of the cement.

Hereinafter, the present disclosure will be described in more detail with reference to examples, but the present disclosure is not limited to these examples.

EXAMPLES

Examples 1 to 8 and Comparative Examples 1 to 9

(Preparation of an Additive Composition for a Tile Cement Mortar)

The additive composition for a tile cement mortar was prepared by mixing cellulose ether and urea at the weight ratios shown in Table 1 below. In Table 1, numbers in parentheses indicate the amount of each component in parts by weight.

TABLE 1

| | Cellulose ether (% by weight) | | | | | Urea (% by weight) |
|---|---|---|---|---|---|---|
| | HEMC1*[1] | HEMC2*[2] | HPMC1*[3] | HPMC2*[4] | MC*[5] | |
| Comparative Example 1 | 96.15 (100) | 0 | 0 | 0 | 0 | 3.85 (4) |
| Comparative Example 2 | 0 | 96.15 (100) | 0 | 0 | 0 | 3.85 (4) |
| Comparative Example 3 | 69.44 (100) | 0 | 0 | 0 | 0 | 30.56 (44) |
| Comparative Example 4 | 0 | 0 | 96.15 (100) | 0 | 0 | 3.85 (4) |
| Comparative Example 5 | 0 | 0 | 0 | 96.15 (100) | 0 | 3.85 (4) |
| Comparative Example 6 | 0 | 0 | 69.44 (100) | 0 | 0 | 30.56 (44) |
| Comparative Example 7 | 0 | 0 | 0 | 0 | 70 (100) | 20 (28.6) |
| Comparative Example 8 | 0 | 0 | 0 | 0 | 90 (100) | 30 (33.3) |
| Comparative Example 9 | 0 | 0 | 0 | 0 | 100 (100) | 40 (40) |
| Example 1 | 95.24 (100) | 0 | 0 | 0 | 0 | 4.76 (5) |
| Example 2 | 90 (100) | 0 | 0 | 0 | 0 | 10 (11.11) |
| Example 3 | 80 (100) | 0 | 0 | 0 | 0 | 20 (25) |

TABLE 1-continued

| | Cellulose ether (% by weight) | | | | | Urea (% by weight) |
|---|---|---|---|---|---|---|
| | HEMC1*1 | HEMC2*2 | HPMC1*3 | HPMC2*4 | MC*5 | |
| Example 4 | 69.93 (100) | 0 | 0 | 0 | 0 | 30.07 (43) |
| Example 5 | 0 | 0 | 95.24 (100) | 0 | 0 | 4.76 (5) |
| Example 6 | 0 | 0 | 90 (100) | 0 | 0 | 10 (11.11) |
| Example 7 | 0 | 0 | 80 (100) | 0 | 0 | 20 (25) |
| Example 8 | 0 | 0 | 69.93 (100) | 0 | 0 | 30.07 (43) |

*1MECELLOSE ® EMA-70U of LOTTE Fine Chemical (Hydroxyethyl methyl cellulose (HEMC), the viscosity of 2 wt % aqueous solution thereof: 60,000 mPa · s)
*2MECELLOSE ® EMA-40U of LOTTE Fine Chemical (Hydroxyethyl methyl cellulose (HEMC), the viscosity of 2 wt % aqueous solution thereof: 40,000 mPa · s)
*3MECELLOSE ® PMC-15U of LOTTE Fine Chemical (Hydroxypropyl methyl cellulose (HPMC), the viscosity of 2 wt % aqueous solution thereof: 15,000 mPa · s)
*4MECELLOSE ® PMC-80H of LOTTE Fine Chemical (Hydroxypropyl methyl cellulose (HPMC), the viscosity of 2 wt % aqueous solution thereof: 8,000 mPa · s)
*5MECELLOSE ® of LOTTE Fine Chemical (Methyl cellulose (MC), the viscosity of 2 wt % aqueous solution thereof: 15,000 mPa · s)

(Preparation of Tile Cement Mortar)

Cement (the product of Asia Cement, ordinary Portland cement): Silica sand: redispersible polymer powder (RDP, Wacker, Vinapas 5044N): the prepared additive composition for a tile cement mortar was mixed at the weight ratios shown in Table 2 to prepare dry-mixed tile cement mortar.

TABLE 2

| Components | Amount (parts by weight) | Remarks |
|---|---|---|
| Cement | 35 | KS L 5201, one kind |
| Silica sand  Silica Sand #6 | 31.5 | >600 μm (Avg. 300 μm) |
| Silica Sand #7 | 31.5 | >250 μm (Avg. 150 μm) |
| RDP (% by weight) | 2 | — |
| Additive composition for a tile cement mortar | 0.3 | See Table 1 |

(Kneading of Tile Cement Mortar)

The dry-mixed tile cement mortar samples were mixed according to the cementum adhesive mixing operation rules of KS L ISO 13007. At this time, the amount of water was adjusted so that the viscosity of each kneaded tile cement mortar had a certain viscosity (500±50 kcps).

Evaluation Example

The physical properties of the kneaded tile cement mortar obtained by mixing the dry-mixed tile cement mortar with water were measured by the following method, and the measurement results are shown in Table 3 below. The amount of water described in Table 3 below was based on 100 parts by weight of the dry-mixed tile cement mortar. Samples and, test conditions were all in accordance with KS L ISO 13007.

(1) Measurement of Visual Open Time

The kneaded tile cement mortar was applied on the concrete ground, and then ceramic tiles are attached thereon for 40 min, at time intervals of 5 mins, and then, the pressure is applied thereon at 19.6 KN/m² for 30 seconds, followed by removal of the ceramic tiles. The maximum time during which the amount of the tile cement mortar attached on the ceramic tiles could be maintained at 50% or more of the total area of the ceramic tiles, was recorded as a visual open time. At this time, the experimental environmental conditions were maintained at 23° C. and 50% humidity conditions.

(2) 30 Minutes-Open Time Adhesive Strength Measurement

The kneaded tile cement mortar was applied on a concrete plate having an area of 40 cm×40 cm, and then, grooves were formed thereon using an uneven trowel (blade size of 6 m×6 m). After that, after the resultant structure was left untouched for 30 minutes, a 5 cm×5 cm porcelain tile (absorption ratio: 15±3%) was put on the above-described tile cement mortar, and the resultant was left untouched under standard conditions (at a temperature of 23±2° C. and 50±5% relative humidity) for 28 days. After curing the resultant, the adhesive strength of the tile cement mortar was measured using an adhesive strength tester while increasing the tensile force at a constant rate of 250±50 N/s. From the measured adhesive strength values, the average adhesive strength was calculated excluding values exceeding the standard deviation of the average adhesive strength, i.e., ±20%. Specifically, for the measurement of the adhesive strength, ten test pieces were manufactured and the average value was obtained. When the measured adhesive strength value was outside the range of ±20% of the average value, the values were discarded and the average of the remaining values was calculated. At this time, when the number of the remaining measurement values was 5 or more, the average value was calculated, and when the number of the remaining measurement values was less than 5, the test was repeatedly performed.

(3) Tensile Adhesive Strength Measurement

Specimen-curing-and-measuring-methods for measuring adhesive strength were in accordance with KS L ISO 13007.

The kneaded tile cement mortar was applied on a concrete plate having an area of 40 cm×40 cm, and then, grooves were formed thereon using an uneven trowel (blade size of 6 m×6 m). After that, after the resultant structure was left untouched for 5 minutes, a 5 cm×5 cm porcelain tile (absorption ratio: 0.2% or less) was put on the above-described tile cement mortar, and the resultant was left untouched under standard conditions (at a temperature of 23±2° C. and 50±5% relative humidity) for 28 days. After curing the resultant, the adhesive strength of the tile cement mortar was measured using an adhesive strength tester while increasing the tensile force at a constant rate of 250±50 N/s. From the measured adhesive strength values, the average adhesive strength was calculated excluding values exceeding the standard deviation of the average adhesive strength, i.e., ±20%. Specifically, for the measurement of the adhesive strength, ten test pieces were manufactured and the average value was obtained. When the measured adhesive strength value was outside the range of ±20% of the average value, the values were discarded and the average of the remaining values was calculated. At this time, when the number of the remaining measurement values was 5 or more, the average value was calculated, and when the number of the remaining measurement values was less than 5, the test was repeatedly performed.

TABLE 3

|  | Water (parts by weight) | Visual open time (minutes) strength (N/mm²) | 30-minute open time adhesive (N/mm²) | Tensile Adhesive Strength |
| --- | --- | --- | --- | --- |
| Comparative Example 1 | 24.5 | 30.0 | 0.64 | 1.29 |
| Comparative Example 2 | 23.5 | 30.0 | 0.66 | 1.26 |
| Comparative Example 3 | 22.0 | 25.0 | 0.23 | 0.49 |
| Comparative Example 4 | 21.5 | 25.0 | 0.55 | 1.12 |
| Comparative Example 5 | 20.5 | 25.0 | 0.52 | 1.10 |
| Comparative Example 6 | 19.0 | 20.0 | 0.41 | 0.66 |
| Comparative Example 7 | 20.5 | 15.0 | 0.16 | 1.13 |
| Comparative Example 8 | 20.0 | 15.0 | 0.17 | 1.10 |
| Comparative Example 9 | 19.5 | 10.0 | 0.14 | 0.92 |
| Example 1 | 24.5 | 35.0 | 1.02 | 1.81 |
| Example 2 | 24.0 | 35.0 | 0.88 | 1.74 |
| Example 3 | 23.0 | 35.0 | 0.70 | 1.46 |
| Example 4 | 22.5 | 30.0 | 0.68 | 1.42 |
| Example 5 | 21.5 | 30.0 | 0.72 | 1.55 |
| Example 6 | 21.0 | 35.0 | 0.94 | 1.68 |
| Example 7 | 20.5 | 30.0 | 0.78 | 1.51 |
| Example 8 | 19.5 | 30.0 | 0.66 | 1.37 |

Referring to Table 3, compared with the kneaded tile cement mortars prepared according to Comparative Examples 1 to 9, the kneaded tile cement mortars prepared according to Examples 1 to 8 showed excellency in at least one physical properties of the visual open time, 30-minute open time adhesive strength, and tensile adhesive strength, and the other properties thereof (if any) were found to be equivalent.

While the present disclosure has been described with reference to Examples, they are merely illustrative, and those skilled in the art would understand that various modifications and other equivalent examples could be made therefrom. Accordingly, the true technical protection scope of the present disclosure should be determined by the technical spirit of the appended claims.

The invention claimed is:

1. A tile cement mortar comprising cement and an additive composition for a tile cement mortar, the additive composition comprising:
   cellulose ether and urea,
   wherein the amount of the urea is from 5 parts by weight to 43 parts by weight based on 100 parts by weight of the cellulose ether,
   wherein the urea has a high solubility in water.

2. The tile cement mortar of claim 1, wherein the amount of the additive composition for a tile cement mortar is from 0.1 parts by weight to 10 parts by weight based on 100 parts by weight of the cement.

3. The tile cement mortar of claim 1, wherein the cellulose ether comprises hydroxypropylmethylcellulose, hydroxyethylmethylcellulose, hydroxyethylethylcellulose, hydroxyethylcellulose, or a combination thereof.

4. The tile cement mortar of claim 1, wherein the cellulose ether does not comprise methylcellulose.

5. The tile cement mortar of claim 1, wherein the viscosity of an aqueous solution of the cellulose ether having a concentration of 2% by weight is from 8,000 mPa·s to 100,000 mPa·s at 20° C. and at 20 rpm when measured using a Brookfield viscometer.

6. The tile cement mortar of claim 1, wherein the urea is physically mixed with the cellulose ether.

7. The tile cement mortar of claim 1, further comprising at least one additive in an amount of 0.01 parts by weight to 200 parts by weight based on 100 parts by weight of the total amount of the cellulose ether and the urea.

* * * * *